(12) United States Patent
Numata

(10) Patent No.: US 11,665,433 B2
(45) Date of Patent: May 30, 2023

(54) IMAGE PROCESSING APPARATUS, CONTROL METHOD THEREOF, IMAGE CAPTURING APPARATUS, MONITORING SYSTEM, AND RECORDING MEDIUM

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/876,614

(22) Filed: May 18, 2020

(65) Prior Publication Data
US 2020/0374469 A1 Nov. 26, 2020

(30) Foreign Application Priority Data
May 22, 2019 (JP) .............................. JP2019-096245

(51) Int. Cl.
*H04N 5/243* (2006.01)
*H04N 7/18* (2006.01)
*H04N 9/04* (2006.01)
*H04N 23/76* (2023.01)
*H04N 23/71* (2023.01)
*H04N 23/84* (2023.01)
*H04N 23/56* (2023.01)

(52) U.S. Cl.
CPC ............. *H04N 23/76* (2023.01); *H04N 7/183* (2013.01); *H04N 23/56* (2023.01); *H04N 23/71* (2023.01); *H04N 23/84* (2023.01)

(58) Field of Classification Search
CPC .............................. H04N 5/243; H04N 5/2351
USPC .............................................. 348/47, 48, 164
See application file for complete search history.

(56) References Cited

U.S. PATENT DOCUMENTS

| 2008/0246950 | A1 | 10/2008 | Ono |
| 2015/0350620 | A1* | 12/2015 | Kuchiki ............. H04N 9/04515 348/223.1 |
| 2018/0246950 | A1* | 8/2018 | Arye ...................... G06F 16/278 |
| 2018/0330165 | A1* | 11/2018 | Halligan .................. G06T 7/97 |
| 2019/0073982 | A1* | 3/2019 | Kanda ...................... H04N 9/77 |

(Continued)

FOREIGN PATENT DOCUMENTS

| CN | 105245863 A | 1/2016 |
| JP | 2017156464 A | 9/2017 |

OTHER PUBLICATIONS

Notification of the First Office Action issued by the State Intellectual Property Office of P. R. China dated Oct. 20, 2021 in corresponding CN Patent Application No. 202010435041.9, with English translation.

*Primary Examiner* — Amir Shahnami
(74) *Attorney, Agent, or Firm* — Carter, DeLuca & Farrell LLP

(57) ABSTRACT

In order to suppress degradation of color reproducibility in a visible light image or a composite image obtained by compositing the visible light image and an infrared light image, an image processing apparatus obtains a first image obtained by a first image capturing element that generates a visible-range image based on incident light from an imaging optical system, estimates received light intensity of infrared light that enters the first image capturing element, and controls a white balance adjustment on the first image based on the received light intensity estimated by the estimation unit.

11 Claims, 7 Drawing Sheets

(56) References Cited

U.S. PATENT DOCUMENTS

| | | |
|---|---|---|
| 2020/0033701 A1 | 1/2020 | Numata |
| 2020/0098148 A1 | 3/2020 | Numata |
| 2020/0137293 A1 | 4/2020 | Numata |
| 2020/0154087 A1 | 5/2020 | Numata |
| 2020/0294214 A1 | 9/2020 | Numata |
| 2020/0366854 A1 | 11/2020 | Numata |

* cited by examiner

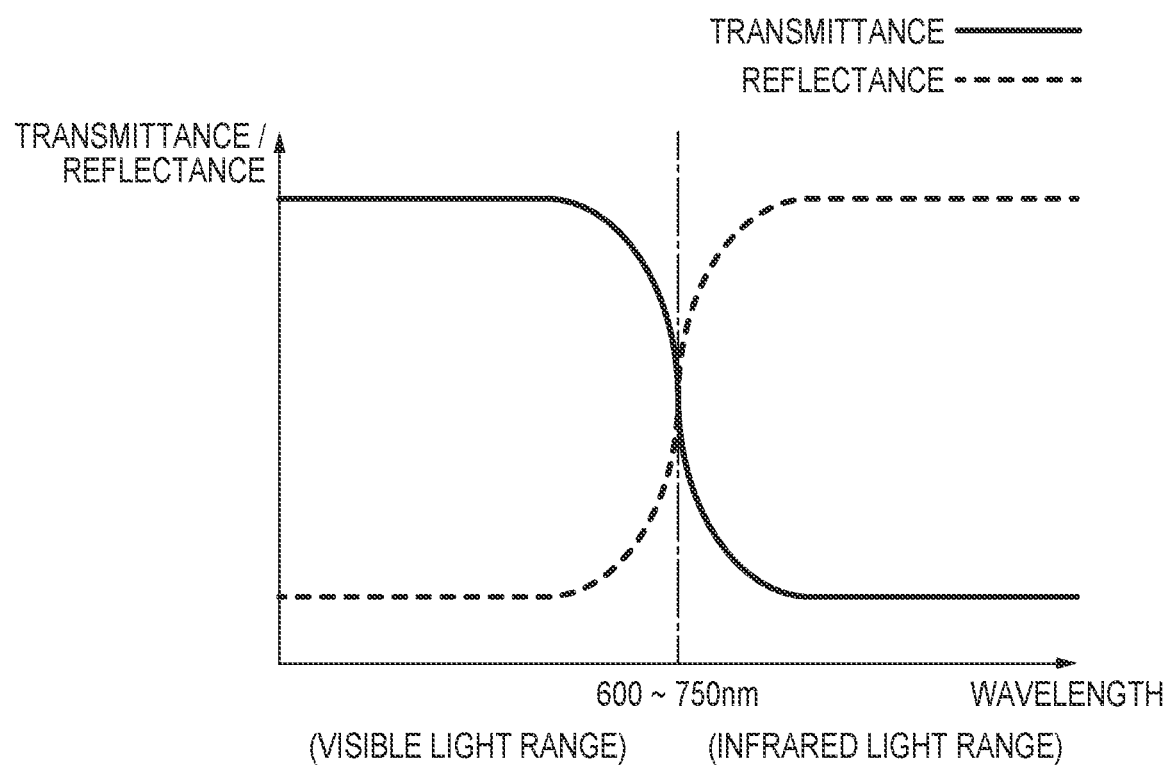

FIG. 4A
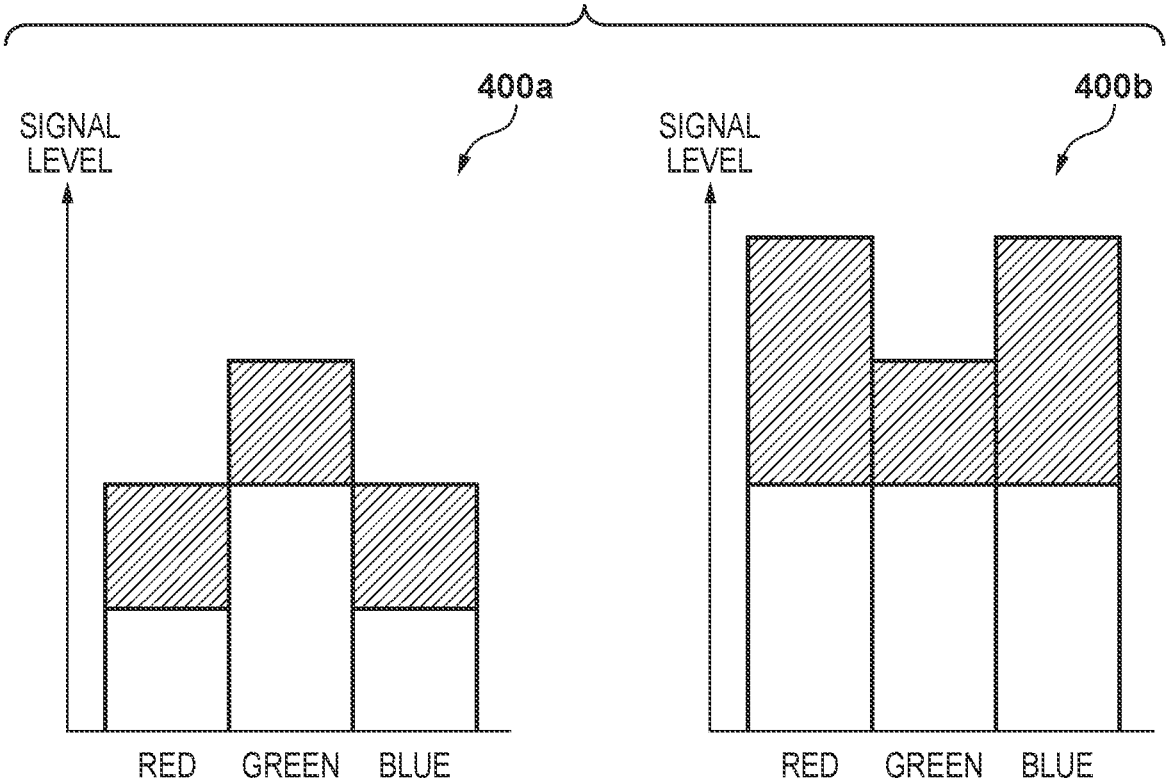
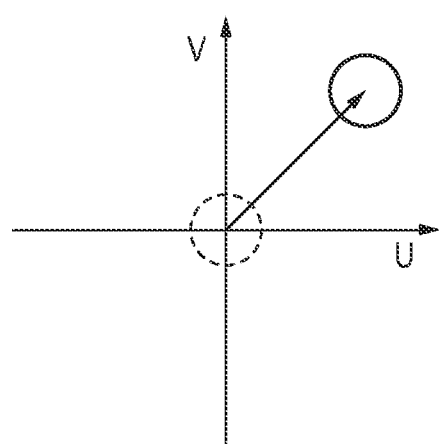
FIG. 4B

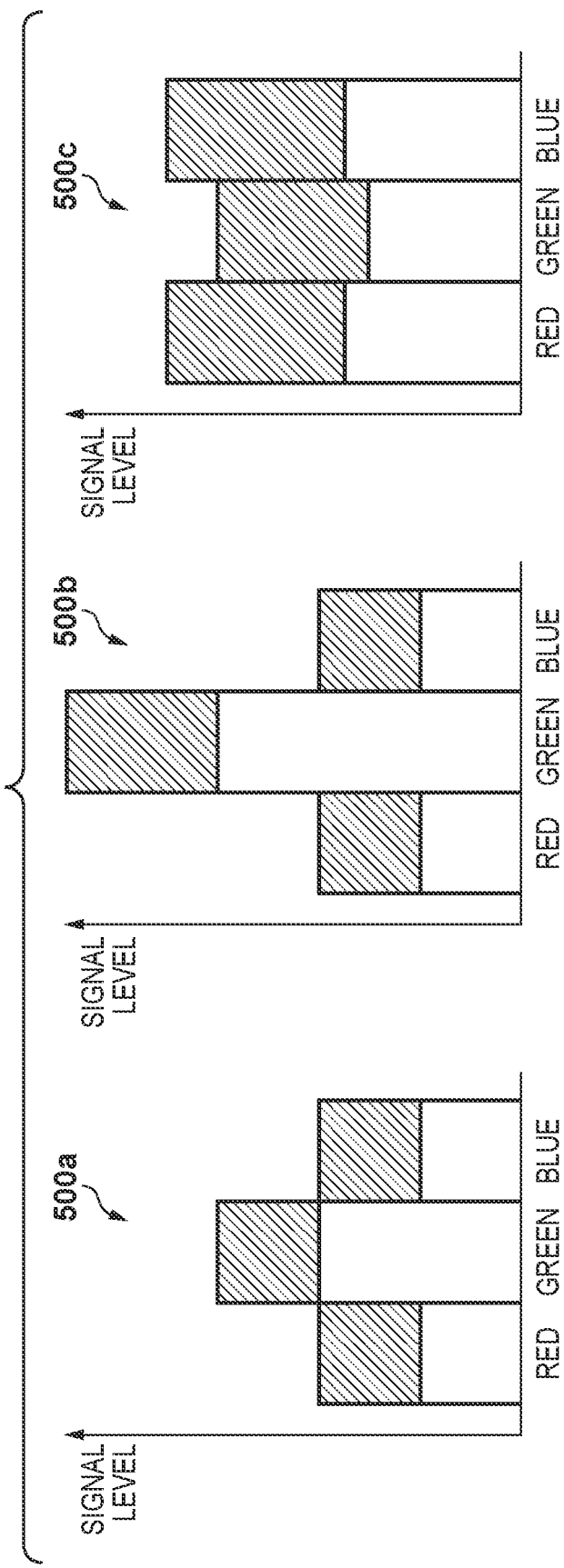
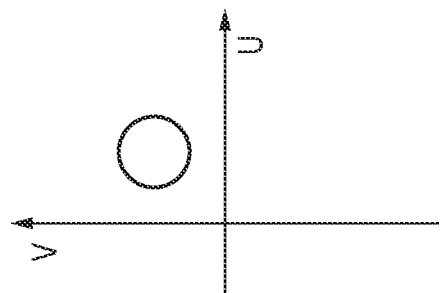

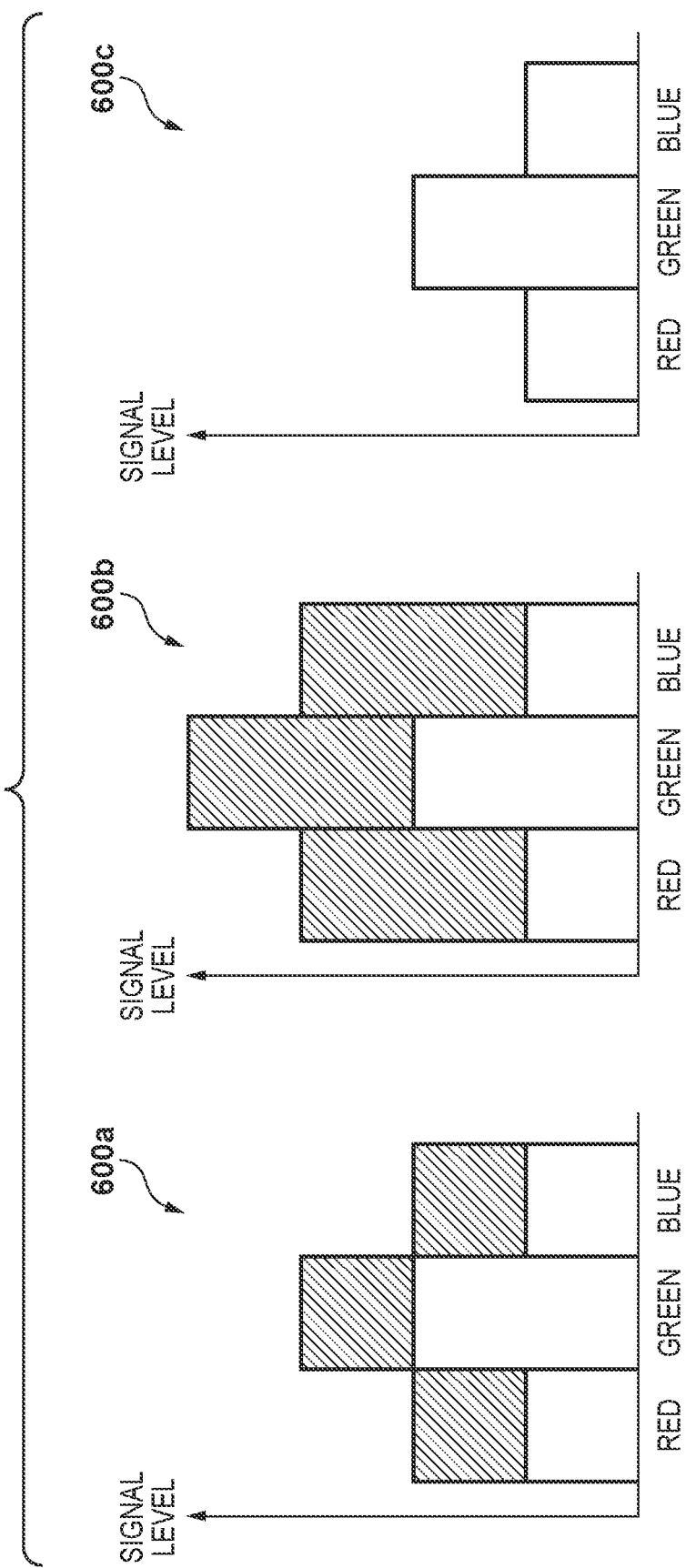

IMAGE PROCESSING APPARATUS, CONTROL METHOD THEREOF, IMAGE CAPTURING APPARATUS, MONITORING SYSTEM, AND RECORDING MEDIUM

BACKGROUND OF THE INVENTION

Field of the Invention

The present invention relates to a technique for improving color reproducibility in a visible light image.

Description of the Related Art

An image capturing apparatus that is used for monitoring purposes and the like is required to obtain a clear object image even at a time of low light intensity such as at night. Hence, there is proposed an image capturing apparatus that includes a solid-state image capturing element which has a sensitivity to infrared light so that a clear object image can be obtained even at a time of low light intensity. There is also proposed an image capturing apparatus that displays a composite image by compositing an image obtained by a solid-state image capturing element which has a sensitivity to visible light and an image obtained by a solid-state image capturing element which has a sensitivity to infrared light (for example, Japanese Patent Laid-Open No. 2017-156464 (patent literature 1)).

In patent literature 1, a wavelength-selective prism is used to separate the visible light and the infrared light, and the visible light and the infrared light are guided to a solid-state image capturing element for capturing visible light and a solid-state image capturing element for capturing infrared light, respectively. However, when strong light is emitted from an infrared illumination unit, it may cause a phenomenon in which some of the infrared light beams will leak into, via the wavelength-selective prism, the solid-state image capturing element for visible light. As a result, the color reproducibility of the image to be obtained by the solid-state image capturing element for visible light will be degraded, and the color reproducibility of the composite image will also be degraded problematically.

SUMMARY OF THE INVENTION

According to one aspect of the present invention, an image processing apparatus comprises: an obtainment unit configured to obtain a first image obtained by a first image capturing element that generates a visible-range image based on incident light from an imaging optical system; an estimation unit configured to estimate received light intensity of infrared light that enters the first image capturing element; and a control unit configured to control a white balance adjustment on the first image based on the received light intensity estimated by the estimation unit.

The present invention suppresses degradation of color reproducibility in a visible light image or a composite image obtained by compositing the visible light image and an infrared light image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a graph exemplarily showing transmittance/reflectance characteristics of a wavelength-selective prism;

FIG. 4A is a view for explaining the white balance adjustment performed when the infrared illumination is high;

FIG. 4B is a coordinate plane showing the position of the white point after the white balance adjustment when the infrared illumination is high;

FIG. 5A is a view for explaining the white balance adjustment according to the first embodiment;

FIG. 5B is a coordinate plane showing the position of the white point after the white balance adjustment according to the first embodiment;

FIG. 6 is a view exemplarily showing the changes in signal levels of visible light when infrared illumination intensity is changed.

DESCRIPTION OF THE EMBODIMENTS

Figure 1:
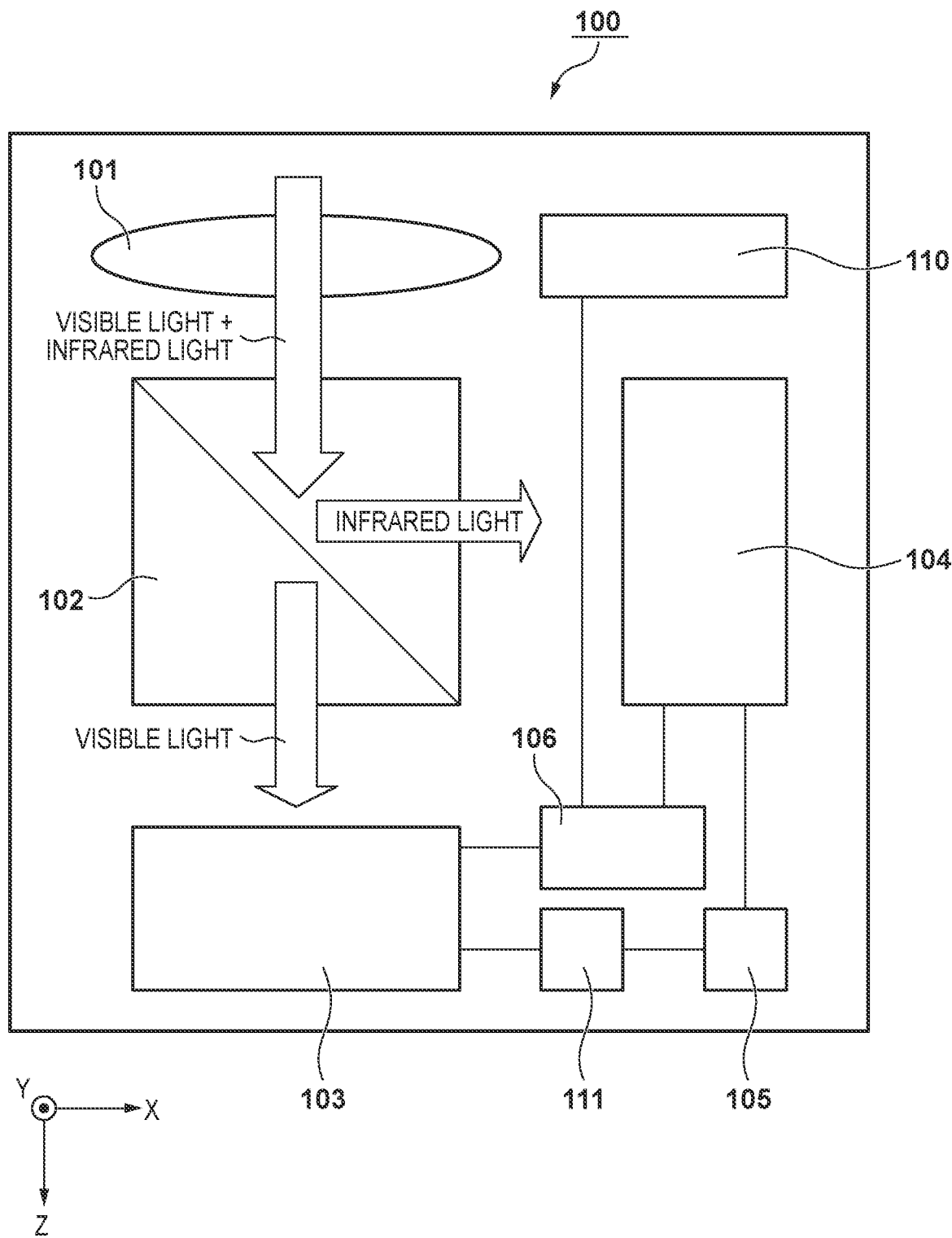
FIG. 1 is a view exemplarily showing the arrangement of an image capturing apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An example of an image capturing apparatus configured to be able to generate a composite image obtained by compositing a visible light image and an infrared light image will be described hereinafter as the first embodiment of an image processing apparatus according to the present invention.

<Apparatus Arrangement>

FIG. 1 is a view exemplarily showing the arrangement of an image capturing apparatus according to the first embodiment. An image capturing apparatus 100 includes an image optical system 101, an optical separation unit 102, an image capturing element (visible light) 103, an image capturing element (infrared light) 104, a composition processing unit 105, a control unit 106, an infrared illumination unit 110, and a white balance adjustment unit 111.

The optical separation unit 102 guides, among incident light components that have passed through the image optical system 101, a visible light component to the image capturing element 103 and an infrared light component to the image capturing element 104. More specifically, the optical separation unit 102 is formed by a wavelength-selective prism. Light (visible light component) which has a wavelength shorter than a wavelength of a specific threshold is transmitted through the wavelength-selective prism, and light (infrared light component) which has a wavelength longer than the wavelength of the specific threshold is reflected by the wavelength-selective prism. Note that the terms "transmitted/reflected" in this case represent that a large portion (for example, 80% or more) of the light is transmitted/reflected. Also, the specific threshold is set to, for example, a value that falls within 600 nm to 750 nm. That is, the boundary between visible light and infrared light is set to be 600 nm to 750 nm. In addition, infrared light represents light of a wavelength equal to or less than 2,500 nm. The visible light will enter the image capturing element 103 and the infrared light will enter the image capturing element 104 by the above-described arrangement.

FIG. 2 is a graph exemplarily showing the transmittance/reflectance characteristics (spectral transmission spectrum/spectral reflectance spectrum). A solid line represents the transmittance, and a dotted line represents the reflectance. As can be understood from FIG. 2, although a large portion of infrared light that passed through the wavelength-selective prism is reflected, some of the infrared light beams are transmitted. Although details will be described later, this transmitted component becomes the cause of color reproducibility degradation in a conventional image capturing apparatus.

The image capturing element 103 has a sensitivity to at least visible light, and the image capturing element 104 has a sensitivity to at least infrared light. For example, an image capturing element that has a sensitivity to light of a wavelength of 380 nm to 1,100 nm can be used as the image capturing element 103 and the image capturing element 104. Hence, a solid-state image capturing element using Si as the material of a photoelectric conversion unit can be used.

Each pixel of the image capturing element 103 for capturing visible light is installed with, for example, either a red (R), green (G), or blue (B) color filter. For example, the image capturing element 103 includes on-chip color filters of an RGB Bayer array. Each pixel of the image capturing element 103 is formed, by this arrangement, as a pixel that detects visible light of a wavelength region corresponding to one of R, G, and B components. Pixels that correspond to R, G, and B components will be referred to as a red pixel, a green pixel, and a blue pixel, respectively, hereinafter.

By the above-described arrangement, color information (that is, one of R, G, and B components) can be obtained in addition to luminance information from a visible light image 107 obtained by the image capturing element 103. On the other hand, only the luminance information can be obtained from an infrared light image 108 obtained by the image capturing element 104. The control unit 106 controls the driving and the readout of each of the image capturing elements 103 and 104.

The infrared illumination unit 110 is a light source that irradiates an image capturing range including an object with infrared light, and is, for example, a light-emitting diode made of a compound semiconductor such as AlGaAs or the like. It is arranged so that the emitted light intensity (emission intensity) from the infrared illumination unit 110 can be changed, and the amount of infrared light entering the image capturing element 104 increases since the reflected infrared light of the object increases as the intensity increases. Hence, the S/N ratio of the infrared light image 108 can be improved by appropriately irradiating the object with infrared light.

For example, the emitted light intensity from the infrared illumination unit 110 can be determined by the light intensity of the image capturing environment or the like, and is controlled by the control unit 106. More specifically, control can be performed so that the emitted light intensity from the infrared illumination unit 110 will increase as the light intensity of the image capturing environment decreases. It can be determined that the image capturing environment has low light intensity when the signal level of each pixel of the visible light image obtained by the image capturing element 103 for visible light is low or when the signal level of a visible light intensity sensor (not shown) is low.

The white balance (WB) adjustment unit 111 is a part for adjusting the color for the visible light image 107 obtained by the image capturing element 103. Although details will be described later, the image capturing apparatus 100 according to the first embodiment is configured to compare the color gain with respect to the signal level of the red pixel to the color gain with respect to the signal level of the blue pixel, and relatively increase the color gain with respect to the signal level of the green pixel, before the white balance adjustment by the white balance adjustment unit 111. This allows color reproducibility degradation to be suppressed. Note that although an arrangement in which color gain adjustment is performed separately before the white balance adjustment will be described below, the color gain adjustment may be performed together with the white balance adjustment.

The composition processing unit 105 composites the white-balance adjusted visible light image 107 and the infrared light image 108 to generate a composite image 109. First, a demosaicing process and a developing process are performed on the visible light image 107 that has been read out in an RGB format in a Bayer array to convert the image into a YUV-format image. Let Y1, U1, and V1 be Y, U, and V signals, respectively, of the obtained YUV-format visible light image 107. In a similar manner, the infrared light image 108 is developed and converted into a YUV-format image. In this case, let Y2 be a Y signal of the infrared light image 108. Note that since the infrared light image 108 does not include color information as described above, the values of U and V signals are zero.

Next, the Y1 signal and the Y2 signal are composited to generate the composite image 109. More specifically, letting Y3, U3, and V3 be the Y, U, and V signals, respectively, of the composite image 109, the composite image 109 is generated by $$Y3 = \alpha \times Y1 + (1-\alpha) \times Y2 \qquad (1)$$

$$U3 = U1 \qquad (2)$$

$$V3 = V1 \qquad (3)$$

where α is a real number which is equal to or more than 0 and is equal to or less than 1. As can be understood from equation (1), the composite image 109 will be an image closer to the visible light image 107 as the value of α increases, and the composite image 109 will be an image closer to the infrared light image 108 as the value of α decreases.

As described above, the image capturing apparatus 100 improves the S/N ratio of the infrared light image 108 by irradiating the object by the infrared illumination unit 110 at the time of low light intensity such as at night. Therefore, the composite image 109 that has color information and luminance information with superior S/N ratio than that of the visible light image 107 can be generated by performing composition processing by the composition processing unit 105.

<Details of Image Processing>

A description of color reproducibility degradation which is a problem of the conventional technique and a description of image processing according to the first embodiment which is a solution to this problem will be given in detail hereinafter.

First, the cause of color reproducibility degradation in a composite image and/or a visible light image, which is obtained by a solid-state image capturing element for visible light, when the emitted light intensity from the infrared illumination unit is high in a conventional image capturing apparatus will be described. Note that although the arrangement of the conventional image capturing apparatus is mostly the same as the arrangement of the image capturing apparatus according to the first embodiment, the details of the contents of control by the control unit 106 and the adjustment by the white balance adjustment unit 111 are different.

Figure 3A:
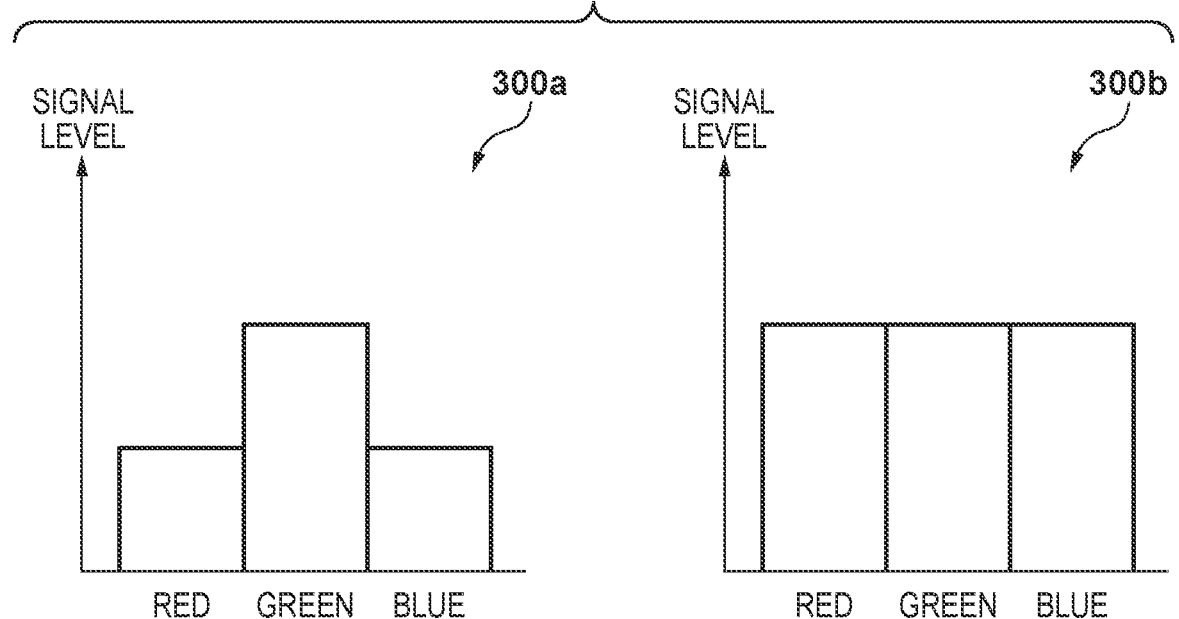
FIG. 3A is a view for explaining a white balance adjustment performed when infrared illumination is absent.
Figure 3B:
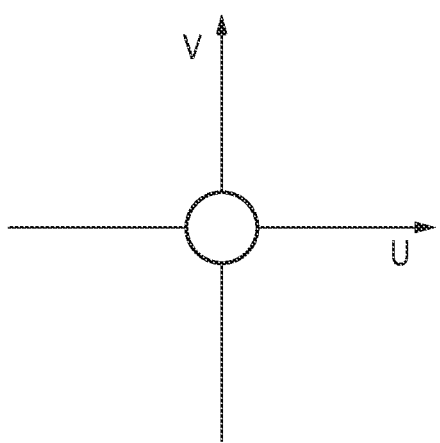
FIG. 3B is a coordinate plane showing the position of a white point after the white balance adjustment when infrared illumination is absent.

FIGS. 3A and 3B are views for explaining the white balance adjustment performed when the emitted light intensity from the infrared illumination unit 110 is zero. On the other hand, FIGS. 4A and 4B are views for explaining the influence on the white balance adjustment when the emitted light intensity from the infrared illumination unit 110 is high. In particular, graphs 300a and 400a exemplarily show the red, blue, and green signal levels of the image capturing element 103 (before the white balance adjustment by the white balance adjustment unit 111). Graphs 300b and 400b exemplarily show the red, blue, and green signal levels after the white balance adjustment. Furthermore, each of FIGS. 3B and 4B exemplarily shows the position of a white point on a UV plane after a YUV-developing process has been performed after the white balance adjustment.

First, a case in which the emitted light intensity from the infrared illumination unit 110 is zero will be described with reference to the graph 300a. The graph 300a shows an example in which the signal level of the green pixel is higher than the signal levels of the red pixel and the blue pixel. In general, the sensitivity of the solid-state image capturing element for visible light obtainment is designed in accordance with the spectral luminous efficiency of a human observer. More specifically, it is designed so that the sensitivity of the green pixel will be higher than the sensitivity of the red pixel and the sensitivity of the blue pixel in the wavelength range of visible light. Hence, before the white balance adjustment, the signal level of the green pixel is higher than the signal level of the red pixels and the signal level of the blue pixel as shown in the graph 300a.

Also, the amount of light entering each of the red, blue, and green pixels changes in accordance with the color temperature of environment light. Thus, to adjust changes in the color balance due to the color temperature of the environment light, a white (including gray) object included in the image will be searched. Subsequently, as shown in the graph 300b, the pixel signal of each color is multiplied by a gain to make the signal levels of the red, green, and blue pixels of the white object match. The gain with respect to the signal level of each color pixel at this time is called a white balance gain.

By performing a white balance adjustment to match the signal levels of the respective pixels, the values of the U signal and the Y signal will become zero in the white-balance adjusted image, as shown in FIG. 3B, when a YUV conversion is performed. That is, the white object can be expressed as a white image regardless of the color temperature of the environment light.

On the other hand, in a case in which the emitted light intensity from the infrared illumination unit 110 is high, some of the infrared light beams transmitted through the optical separation unit 102 (the wavelength-selective prism) will enter the pixels of the image capturing element 103. That is, as described with reference to FIG. 2, some of the infrared light beams will be transmitted and will enter the image capturing element 103.

In this case, although there is a requirement with respect to the sensitivity toward visible light to each color pixel of the image capturing element 103 for visible light obtainment, there is no requirement with respect to the sensitivity toward infrared light. Hence, the sensitivity of the visible-light obtainment image capturing element 103 to the wavelength range of the infrared light is about the same in the red, green, and blue pixels.

As a result, a state as shown in the graph 400a is obtained if some of the emitted light beams from the infrared illumination unit mix into the pixels of the image capturing element 103. In the graph 400a, the hatched portions exemplarily show the components due to the infrared light beams that have mixed into the pixels. As can be understood from the graph 400a, the signal level of the green pixel is relatively low and the signal levels of the red pixel and the blue pixel are relatively high in the ratio of the signal levels of the respective colors. Hence, if the white balance gain which is obtained when the emitted light intensity from the infrared illumination unit is zero is directly used, the signal levels of the red pixel and the blue pixel will be higher than the signal level of the green pixel as shown in the graph 400b. As a result, as shown in FIG. 4B, the U signal and the V signal will move to the positive side, and a color shift in a magenta (reddish-purple) direction will occur in the entire visible light image.

As described above, since the infrared light image 108 does not include color information, a color shift in the magenta direction will also occur in the composite image 109 when the color of the visible light image 107 shifts in the magenta direction. That is, the color reproducibility will degrade also in the composite image 109 after the composition processing.

Therefore, in the image capturing apparatus 100 according to the first embodiment, color reproducibility degradation is suppressed by setting, in the white balance adjustment unit 111, a higher gain with respect to each of the red pixel and the blue pixel than the gain with respect to the green pixel, before the white balance adjustment is performed.

FIG. 5A is a view for explaining the white balance adjustment performed, when the emitted light intensity from the infrared illumination unit 110 is high, according to the first embodiment. A graph 500a exemplarily shows the red, blue, and green signal levels of the image capturing element 103 (before the white balance adjustment by the white balance adjustment unit 111). A graph 500c exemplarily shows the red, blue, and green signal levels after the white balance adjustment. Furthermore, FIG. 5B exemplarily shows the position of a white point on a UV plane after a YUV-developing process has been performed after the white balance adjustment.

In the image capturing apparatus 100, some of the emitted light beams from the infrared illumination unit will also mix into the pixels of the image capturing element 103 in a similar manner to the conventional image capturing apparatus. That is, the signal levels of the respective color pixels shown in the graph 500a are equal to the signal levels of the respective color pixels shown in the graph 400a, but are different from the signal levels of the respective color pixels shown in the graph 300a.

Hence, in the image capturing apparatus 100, the signal level of the green pixel is multiplied, before the white balance adjustment, by a relatively higher color gain than the gain by which each of the signal levels of the red pixel and the blue pixel is multiplied. A graph 500b exemplarily shows the red, blue, and green signal levels when the signal level of each color pixel shown in the graph 500a has been multiplied by the corresponding color gain. Subsequently, the white balance adjustment is performed on the signal levels of the respective color pixels shown in the graph 500b by directly using the white balance gain of a case in which the emitted light intensity from the infrared illumination unit 110 is zero. As a result of this arrangement, the difference between the signal levels of the color pixels can be suppressed more in the graph 500c than in the graph 400b. As a result, as can be understood by referring to the graph 500c and FIG. 5B, the color shift in the magenta direction in the visible light image can be suppressed compared to that in the conventional image capturing apparatus. That is, it is also possible to suppress color reproducibility degradation in the composite image 109 after the composition processing.

<Details of Level Adjustment (Of Color Gain with Respect to Each Color) Before White Balance Adjustment>

In order to improve the color reproducibility after the white balance adjustment (to bring the white point closer to the origin in FIG. 5B), the received light intensity of a signal component (to be referred to as a stray light component) due to the infrared light that have mixed into the pixels needs to be known in the graph 500a. Two methods for estimating the received light intensity of the stray light component will be described below.

The first method is a method in which images are obtained at a plurality of different times, while changing the emitted light intensity from the infrared illumination unit 110 in accordance with the elapsed time, to evaluate the signal levels of the respective color pixels.

FIG. 6 is a view exemplarily showing the change in the signal levels of the visible light when the emitted light intensity from the infrared illumination unit 110 is changed. A graph 600a exemplarily shows the red, blue, and green signal levels of the image capturing element 103, and is the same as the graphs 400a and 500a. A graph 600b exemplarily shows the red, blue, and green signal levels of the image capturing element 103 obtained in a case in which the emitted light intensity from the infrared illumination unit 110 has been doubled with respect to the graph 600a.

As can be understood from referring to the graphs 600a and 600b, in the graph 600b, only each stray light component has changed with respect to the graph 600a. Hence, the stray light component can be estimated by subtracting each signal level of the graph 600a from a corresponding signal level of the graph 600b. Hence, by subtracting the stray light component obtained from the corresponding signal level indicated in the graph 600a, the signal level of the corresponding color pixel excluding the stray light component shown in the graph 600c can be obtained. That is, ideally, the signal levels of respective color pixels can be obtained in the same manner as the graph 300a. When the signal level of each color pixel excluding the stray light component has been obtained, each obtained signal level can be multiplied, before the white balance adjustment, by the corresponding color gain so that the red pixel, the green pixel, and the blue pixel can be reproduced at the same ratio as that of the graph 600c.

Note that although the emitted light intensity is doubled in the above-described example for the sake of descriptive convenience, it is sufficient to obtain the signal levels of two arbitrary different kinds of emitted light beams that have different intensities from each other. That is, each signal level at an intensity of an arbitrary emitted light beam can be obtained by using the corresponding signal level containing only the stray light component that is obtained by subtracting the corresponding signal level (the graph 600a) at an intensity of a first emitted light beam from the corresponding signal level (the graph 600b) at the intensity of the second emitted light beam.

In addition, as can be understood by comparing the graph 600a and the graph 600b, it is preferable to make the color gain with respect to the signal level of the green pixel higher than the color gain with respect to the signal level of the red pixel and the signal level of the blue pixel as the emitted light intensity from the infrared illumination unit 110 increases.

The second method is a method using the spatial distribution of the emitted light intensity from the infrared illumination unit 110. In general, the distribution of emitted light from an LED is highest in a direction along the optical axis of the LED, and the emitted light intensity decreases as the distance from the optical axis increases. Hence, in a case in which the optical axis of the infrared illumination unit 110 matches the center (the optical axis of the image optical system 101) of image capturing apparatus 100 in the image capturing direction, the stray light component will decrease as the image height of the image capturing element 103 increases.

Thus, a plurality of signal levels in which only the respective stray light components differ can be obtained by obtaining the signal levels of a plurality of image regions (pixel positions) with different image heights within an image. Therefore, by performing, in the same manner as the first method described with reference to FIG. 6, a difference calculation between the plurality of signal levels in which only the respective stray light components differ, the signal level of each color pixel excluding the corresponding stray light component can be obtained.

Note that the estimation of the stray light component may be performed each time the emitted light intensity from the infrared illumination unit 110 changes, or the estimation may be performed at the time of installation of the image capturing apparatus 100 and this data may be referred. Although the stray light component estimation accuracy will be higher in the former case, it will prolong the time required to obtain an image in which the color reproducibility degradation has been suppressed since image obtainment will be required to perform the stray light estimation. On the other hand, although the stray light component estimation accuracy will be lower in the latter case, it can shorten the time required to obtain an image in which the color reproducibility degradation has been suppressed.

In general, the signal level is determined based on three factors, that is, the spectral distribution of illumination light including the environment light, the spectral reflectance of the object, and the spectral sensitivity of the pixel. In this case, if an image capturing apparatus that is capturing a fixed point is assumed, the position of a white object which is not a moving body will not change. Hence, only the spectral distribution of the illumination light will be a factor that will temporally change. Furthermore, the emitted light from the infrared illumination unit 110 is more dominant than the environment light in the wavelength range of the infrared light. Therefore, the received light intensity of the stray light component will barely change as long as the emitted light intensity from the infrared illumination unit 110 does not change.

Thus, in a case in which a fixed point is to be captured for monitoring purposes or the like, it is possible to suppress color reproducibility degradation with good accuracy and in a short time even if the latter arrangement (the arrangement in which the stray light component estimation is performed in advance at the time of the installation of the image capturing apparatus 100) is adopted.

As described above, according to the first embodiment, the color gain with respect to each color is adjusted before the white balance adjustment. In particular, the color gain with respect to the green pixel will be set higher than the color gain with respect to the red pixel and the color gain with respect to the blue pixel. This arrangement can suppress the color shifting of the visible light image in the magenta direction. That is, the degradation of color reproducibility can also be suppressed in a composite image after the composition processing. Note that although it has been described above as if the image capturing apparatus 100 will constantly generate the composite image 109, an operation mode that outputs the visible light image 107 or the infrared light image 108 may be provided. For example, it may be arranged so that the visible light image 107 will be output when there is sufficient light intensity in the visible light range and the composite image 109 or the infrared light image 108 of only the infrared light range will be output when the light intensity has decreased. Note that it may be arranged so as to switch and output images sequentially from the visible light image 107 to the composite image 109, and from the composite image 109 to the infrared light image 108 in accordance with the reduction of the light intensity.

(Modification)

As described above, the received light intensity of the stray light component depends on the characteristic (more specifically, the transmittance in the infrared light wavelength range) of the wavelength-selective prism. Hence, it can be arranged so that the above-described color gain adjustment will be performed when the transmittance in the infrared light wavelength range is equal to or more than a predetermined factor (for example, 1%, 10%, or the like). Note that the although an arrangement in which the visible light and the infrared light are separated by using the wavelength-selective prism has been described, it may be arranged so that the visible light and the infrared light will be captured independently by using separate optical systems.

Note that it is possible to automatically search for a white object and adjust the white balance (so-called auto white balance (AWB)) after the emitted light intensity from the infrared illumination unit 110 has changed. However, it is preferable to simultaneously perform color gain adjustment with the change in the emitted light intensity from the infrared illumination unit 110.

That is, if it is arranged so that the white balance will be adjusted after the emitted light intensity from the infrared illumination unit 110 has changed, image obtainment for the white balance adjustment will need to be newly performed. As a result, it will require more time until an image in which the color reproducibility degradation is suppressed will be obtained. On the other hand, by simultaneously performing color gain adjustment with the change in the emitted light intensity from the infrared illumination unit 110, the white balance adjustment can be performed accurately by following, at about real time, the change in the emitted light intensity from the infrared illumination unit 110.

In addition, in a case in which the emitted light intensity from the infrared illumination unit 110 is too high, it becomes difficult to search for a white object, and the white balance adjustment tends to become insufficient as a result. This is because the color shift in the magenta direction will occur strongly in the white object when the emitted light intensity from the infrared illumination unit 110 is high. In such a case, the image capturing apparatus 100 will determine the white object as a magenta object, and, as a result, the white balance adjustment amount will become insufficient.

Note that it may be arranged so that a first color adjustment operation using the color gain will be performed simultaneously with the change in the emitted light intensity from the infrared illumination unit 110, and that a second color adjustment operation (auto white balance adjustment) will be performed after the intensity of the illumination light has changed (that is, after the application of the first color adjustment). In the case of such an arrangement, it is possible to perform a two-stage adjustment in which the white balance is coarsely adjusted at the time of color gain adjustment, and the white balance is further finely adjusted after the intensity of the illumination light has actually changed.

This two-stage adjustment is preferable, compared to an arrangement which performs only the color gain adjustment, in the point that the color reproducibility degradation can be suppressed even if the stray light component is not accurately obtained at the time of the color gain adjustment. It is also preferable, compared to an arrangement which performs only the auto white balance adjustment, in the point that a white object can be correctly recognized as the white object in a case in which the emitted light intensity from the infrared illumination unit 110 is high.

It may be arranged so that the user will be able to select whether to use the color gain adjustment by the stray light component estimation or the auto white balance adjustment, as a matter of course.

Second Embodiment

The second embodiment will describe an embodiment performed as a monitoring system that includes a monitoring apparatus and a client apparatus.

Figure 7:
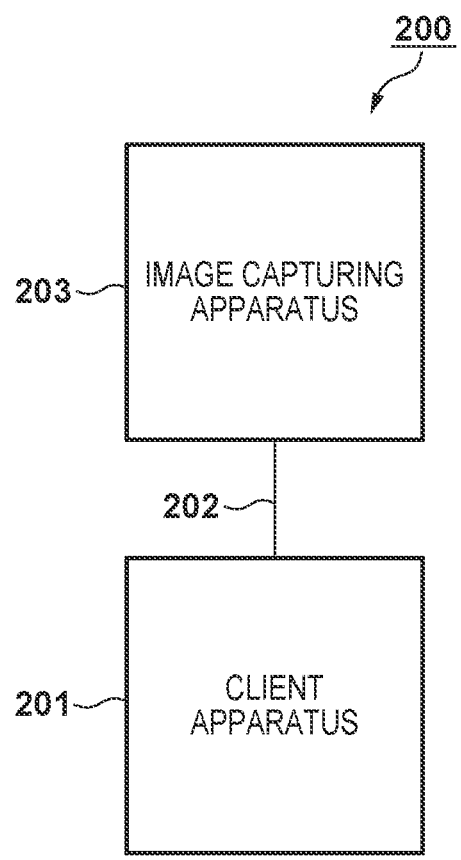
FIG. 7 is a block diagram showing the overall arrangement of a monitoring system that includes an image capturing apparatus.

FIG. 7 is a block diagram showing the overall arrangement of a monitoring system that includes an image capturing apparatus 203. In this case, the image capturing apparatus 203 is an apparatus that includes the same hardware arrangement (FIG. 1) as that of an image capturing apparatus 100 according to the first embodiment. However, it is arranged so that some of the control operations performed by a control unit 106 are performed by a client apparatus 201 which is operated by a user. The image capturing apparatus 203 and the client apparatus 201 are communicably connected to each other via a network 202. Note that although FIG. 7 shows only one image capturing apparatus 203 and one client apparatus 201, it may be arranged so that a plurality of image capturing apparatuses and a plurality of client apparatuses will be used.

The client apparatus 201 transmits various kinds of commands to control the image capturing apparatus 203. Based on the command received from the client apparatus 201, the image capturing apparatus 203 transmits a response corresponding to the command or captured image data to the client apparatus 201. The parameters to be used by the image capturing apparatus 203 for image capturing can be selected by the user via the client apparatus 201.

The client apparatus 201 is, for example, a device such as a PC, and the network 202 is formed by a wired LAN, a wireless LAN, or the like. In addition, it may be arranged so that the power supply of the image capturing apparatus 203 will be supplied via the network 202.

As described above, according to the second embodiment, the client apparatus 201 which is operated by the user is formed separately from the image capturing apparatus 203. This arrangement will allow the user to control the image capturing apparatus 203 that is in a remote location. In addition, it will also allow the user to collectively manage the plurality of image capturing apparatuses 203.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-096245, filed May 22, 2019 which is hereby incorporated by reference herein in its entirety.

What is claimed is:

1. An image processing apparatus comprising:
one or more processors; and
a memory for storing instructions to be executed by the one or more processors, wherein, when the instructions stored in the memory are executed by the one or more processors, the image processing apparatus functions as:
   an obtainment unit configured to obtain a first image obtained by a first image capturing element that generates a visible-range image based on incident light from an imaging optical system, the first image being formed by a red pixel, a green pixel, and a blue pixel;
   an illumination unit configured to emit infrared light to an image capturing range which includes an object included in the first image;
   an estimation unit configured to estimate received light intensity of infrared light that enters the first image capturing element based on an emission intensity of the infrared light emitted from the illumination unit; and
   a control unit configured to control a white balance adjustment on the first image by setting a color gain with respect to the green pixel in the first image to be higher than a color gain with respect to the red pixel and a color gain with respect to the blue pixel as the received light intensity increases based on the received light intensity estimated by the estimation unit,
wherein the illumination unit is configured so as to be able to change the emission intensity of the infrared light in accordance with an elapse of time, and
the control unit determines the color gain with respect to each of the green pixel, the red pixel, and the blue pixel by comparing signal levels of a plurality of first images obtained by the first image capturing element at a plurality of times with different emission intensities by the illumination unit.

2. An image processing apparatus comprising:
one or more processors; and
a memory for storing instructions to be executed by the one or more processors, wherein, when the instructions stored in the memory are executed by the one or more processors, the image processing apparatus functions as:
   an obtainment unit configured to obtain a first image obtained by a first image capturing element that generates a visible-range image based on incident light from an imaging optical system, the first image being formed by a red pixel, a green pixel, and a blue pixel;
   an illumination unit configured to emit infrared light to an image capturing range which includes an object included in the first image;
   an estimation unit configured to estimate received light intensity of infrared light that enters the first image capturing element based on an emission intensity of the infrared light emitted from the illumination unit; and
   a control unit configured to control a white balance adjustment on the first image by setting a color gain with respect to the green pixel in the first image to be higher than a color gain with respect to the red pixel and a color gain with respect to the blue pixel as the received light intensity increases based on the received light intensity estimated by the estimation unit,
wherein the illumination unit is configured to emit the infrared light at an emission intensity that has a predetermined spatial distribution with respect to the image capturing range, and
the control unit determines the color gain of each of the green pixel, the red pixel, and the blue pixel by comparing signal levels of a plurality of pixel positions in the first image.

3. An image processing apparatus comprising:
one or more processors; and a memory for storing instructions to be executed by the one or more processors, wherein, when the instructions stored in the memory are executed by the one or more processors, the image processing apparatus functions as:

an obtainment unit configured to obtain a first image obtained by a first image capturing element that generates a visible-range image based on incident light from an imaging optical system, the first image being formed by a red pixel, a green pixel, and a blue pixel;

an estimation unit configured to estimate received light intensity of infrared light that enters the first image capturing element; and a control unit configured to control a white balance adjustment on the first image by setting a color gain with respect to the green pixel in the first image to be higher than a color gain with respect to the red pixel and a color gain with respect to the blue pixel as the received light intensity increases based on the received light intensity estimated by the estimation unit, wherein white balance adjustment includes a first color adjustment for performing adjustment based on the color gain and a second color adjustment that searches for a white object to adjust the white balance of an image adjusted by the first color adjustment.

4. The apparatus according to claim 1, wherein the first image capturing element is configured to generate the visible-range image based on a visible light component separated by an optical separation unit configured to separate the incident light from the image forming optical system into the visible light component and an infrared light component, the obtainment unit is configured to further obtain a second image obtained by a second image capturing element that generates an image of an infrared light range based on the infrared light component separated by the optical separation unit, and the image processing apparatus further comprises a composition unit configured to generate a composite image obtained by compositing the first image and a second image to which the white balance adjustment has been applied.

5. A control method of an image processing apparatus, the control method comprising:

obtaining a first image obtained by a first image capturing element that generates a visible-range image based on incident light from an imaging optical system, the first image being formed by a red pixel, a green pixel, and a blue pixel;

controlling an illumination unit to emit infrared light to an image capturing range which includes an object included in the first image;

estimating received light intensity of infrared light that enters the first image capturing element based on an emission intensity of the infrared light emitted from the illumination unit; and controlling a white balance adjustment on the first image by setting a color gain with respect to the green pixel in the first image to be higher than a color gain with respect to the red pixel and a color gain with respect to the blue pixel as the received light intensity increases based on the received light intensity estimated in the estimating, wherein in the illumination controlling, control is performed so as to change the emission intensity of the infrared light in accordance with an elapse of time, and the color gain with respect to each of the green pixel, the red pixel, and the blue pixel is determined, in the controlling, by comparing signal levels of a plurality of first images obtained by the first image capturing element at a plurality of times with different emission intensities by the illumination unit.

6. An image capturing apparatus comprising:

an imaging optical system;

one or more processors; and a memory for storing instructions to be executed by the one or more processors, wherein, when the instructions stored in the memory are executed by the one or more processors, the image capturing apparatus functions as:

an optical separation unit configured to separate incident light from the imaging optical system into a visible light component and an infrared light component;

a first image capturing element configured to generate a first image of a visible light range based on the visible light component;

a second image capturing element configured to generate a second image of an infrared light range based on the infrared light component;

an adjustment unit configured to perform a white balance adjustment on the first image generated by the first image capturing element;

an illumination unit configured to emit the infrared light to an image capturing range which includes an object included in the first image;

a control unit configured to control, based on a received light intensity of infrared light that enters the first image capturing element, the white balance adjustment by the adjustment unit by setting a color gain with respect to a green pixel to be higher than a color gain with respect to a red pixel and a color gain with respect to a blue pixel in the first image as the received light intensity increases, and configured to estimate the received light intensity based on an emission intensity of the infrared light emitted from the illumination unit; and a composition unit configured to generate a composite image by compositing the first image on which the white balance adjustment by the adjustment unit has been applied and the second image generated by the second image capturing element, wherein the illumination unit is configured to be able to change the emission intensity of the infrared light in accordance with an elapse of time, and the control unit determines the color gain with respect to each of the green pixel, the red pixel, and the blue pixel by comparing signal levels of a plurality of first images obtained by the first image capturing element at a plurality of times with different emission intensities by the illumination unit.

7. A monitoring system that includes an image capturing apparatus and a client apparatus which are connected to each other via a network, wherein the image capturing apparatus comprises:

an imaging optical system;

one or more processors; and a memory for storing instructions to be executed by the one or more processors, wherein, when the instructions stored in the memory are executed by the one or more processors, the image capturing apparatus functions as:

an optical separation unit configured to separate incident light from the imaging optical system into a visible light component and an infrared light component;

a first image capturing element configured to generate a first image of a visible light range based on the visible light component;

a second image capturing element configured to generate a second image of an infrared light range based on the infrared light component;

an adjustment unit configured to perform a white balance adjustment on the first image generated by the first image capturing element;

an illumination unit configured to emit the infrared light to an image capturing range which includes an object included in the first image;

a control unit configured to control, based on a received light intensity of infrared light that enters the first image capturing element, the white balance adjustment by the adjustment unit, by setting a color gain with respect to a green pixel to be higher than a color gain with respect to a red pixel and a color gain with respect to a blue pixel in the first image as the received light intensity increases, and configured to estimate the received light intensity based on an emission intensity of the infrared light emitted from the illumination unit; and a composition unit configured to generate a composite image by compositing the first image on which the white balance adjustment by the adjustment unit has been applied and a second image generated by the second image capturing element, and wherein the client apparatus receives an image obtained by the image capturing unit, wherein the illumination unit is configured to be able to change the emission intensity of the infrared light in accordance with an elapse of time, and the control unit determines the color gain with respect to each of the green pixel, the red pixel, and the blue pixel by comparing signal levels of a plurality of first images obtained by the first image capturing element at a plurality of times with different emission intensities by the illumination unit.

8. A non-transitory computer-readable recording medium storing a program that causes a computer to function as an image processing apparatus comprising:

one or more processors; and a memory for storing instructions to be executed by the one or more processors, wherein, when the instructions stored in the memory are executed by the one or more processors, the image processing apparatus functions as:

an obtainment unit configured to obtain a first image obtained by a first image capturing element that generates a visible-range image based on incident light from an imaging optical system, the first image being formed by a red pixel, a green pixel, and a blue pixel;

an illumination unit configured to emit infrared light to an image capturing range which includes an object included in the first image;

an estimation unit configured to estimate received light intensity of infrared light that enters the first image capturing element based on an emission intensity of the infrared light emitted from the illumination unit; and a control unit configured to control a white balance adjustment on the first image by setting a color gain with respect to the green pixel in the first image to be higher than a color gain with respect to the red pixel and a color gain with respect to the blue pixel as the received light intensity increases based on the received light intensity estimated by the estimation unit, wherein the illumination unit is configured so as to be able to change the emission intensity of the infrared light in accordance with an elapse of time, and the control unit determines the color gain with respect to each of the green pixel, the red pixel, and the blue pixel by comparing signal levels of a plurality of first images obtained by the first image capturing element at a plurality of times with different emission intensities by the illumination unit.

9. An image processing apparatus comprising:

a first image capturing element having sensitivity to visible light;

a second image capturing element having sensitivity to infrared light;

one or more processors; and a memory for storing instructions to be executed by the one or more processors, wherein, when the instructions stored in the memory are executed by the one or more processors, the image processing apparatus functions as:

an obtainment unit configured to obtain a first image obtained by the first image capturing element that generates a visible-range image based on incident light from an imaging optical system;

an estimation unit configured to estimate received light intensity of infrared light that enters not the second capturing element but the first image capturing element; and a control unit configured to control a white balance adjustment on the first image based on the received light intensity estimated by the estimation unit, wherein the first image is formed by a red pixel, a green pixel, and a blue pixel, and the control unit performs control to perform the white balance adjustment by setting a color gain with respect to the green pixel in the first image to be higher than a color gain with respect to the red pixel and a color gain with respect to the blue pixel as the estimated light intensity of infrared light increases.

10. A control method of an image processing apparatus, the control method comprising:

obtaining a first image obtained by a first image capturing element that generates a visible-range image based on incident light from an imaging optical system;

estimating received light intensity of infrared light that enters not a second image capturing element that has sensitivity to infrared light but the first image capturing element; and controlling a white balance adjustment on the first image based on the estimated light intensity, wherein the first image is formed by a red pixel, a green pixel, and a blue pixel, and the white balance adjustment is controlled by setting a color gain with respect to the green pixel in the first image to be higher than a color gain with respect to the red pixel and a color gain with respect to the blue pixel as the estimated light intensity of infrared light increases.

11. A non-transitory computer-readable recording medium storing a program that causes a computer to function as an image processing apparatus comprising:
- a first image capturing element having sensitivity to visible light;
- a second image capturing element having sensitivity to infrared light;
- one or more processors; and
- a memory for storing instructions to be executed by the one or more processors, wherein, when the instructions stored in the memory are executed by the one or more processors, the image processing apparatus functions as:
  - an obtainment unit configured to obtain a first image obtained by the first image capturing element that generates a visible-range image based on incident light from an imaging optical system;
  - an estimation unit configured to estimate received light intensity of infrared light that enters not the second image capturing element but the first image capturing element; and
  - a control unit configured to control a white balance adjustment on the first image based on the received light intensity estimated by the estimation unit,
- wherein the first image is formed by a red pixel, a green pixel, and a blue pixel, and
- the control unit performs control to perform the white balance adjustment by setting a color gain with respect to the green pixel in the first image to be higher than a color gain with respect to the red pixel and a color gain with respect to the blue pixel as the estimated light intensity of infrared light increases.

* * * * *